United States Patent [19]

Tiwari et al.

[11] Patent Number: 6,008,848
[45] Date of Patent: Dec. 28, 1999

[54] VIDEO COMPRESSION USING MULTIPLE COMPUTING AGENTS

[75] Inventors: Prasoon Tiwari, Croton-on-Hudson, N.Y.; Eric Viscito, San Francisco, Calif.

[73] Assignee: International Business Machines Corporation, Armonk, N.Y.

[21] Appl. No.: 08/873,201

[22] Filed: Jun. 11, 1997

Related U.S. Application Data

[62] Division of application No. 08/471,315, Apr. 6, 1995, Pat. No. 5,694,170.

[51] Int. Cl.$^6$ ...................................................... H04N 7/32
[52] U.S. Cl. ............................................ 348/409; 348/390
[58] Field of Search ..................................... 348/420, 419, 348/405, 384, 390, 400–402, 407, 409–413, 415, 699, 416; H04N 7/137, 7/32

[56] References Cited

U.S. PATENT DOCUMENTS

| | | | |
|---|---|---|---|
| 5,231,484 | 7/1993 | Gonzales et al. | 348/405 |
| 5,337,049 | 8/1994 | Shimoda | 348/420 |
| 5,473,377 | 12/1995 | Kim | 348/419 |
| 5,552,832 | 9/1996 | Astle | 348/420 |
| 5,686,964 | 11/1997 | Tabatabai et al. | 348/415 |
| 5,719,632 | 2/1998 | Hoang et al. | 348/405 |
| 5,771,316 | 6/1998 | Uz | 348/416 |

*Primary Examiner*—Richard Lee
*Attorney, Agent, or Firm*—Daniel P. Morris; Anne Vachon Dougherty

[57] ABSTRACT

A system and method of using multiple processors to perform video compression is provided. A video sequence is partitioned into subsequences and processing assignments for the subsequences are distributed among a plurality of processors. A picture type is then determined for each picture in each subsequence and the encoding complexity of each picture is modeled, based on the picture type. Based on the modeling, a number of bits is allocated to each picture. Each picture is then compressed in accordance with the bits allocated. Another aspect provides for encoding of pictures in a video sequence using dynamic modeling of the encoding complexity of future pictures in the video sequence. Bits are allocated to the encoding of a current picture in the video sequence based on the dynamic model. The current picture is then encoded based on the bits allocated.

6 Claims, 13 Drawing Sheets

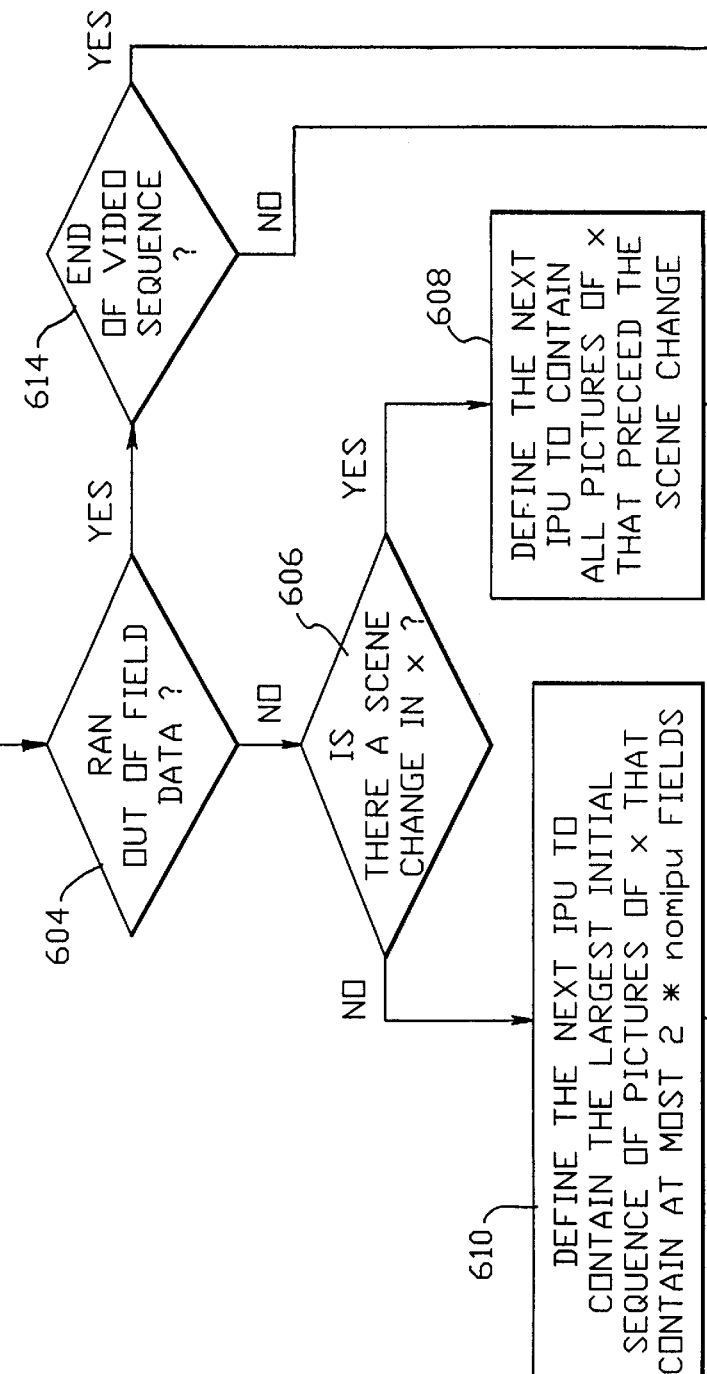

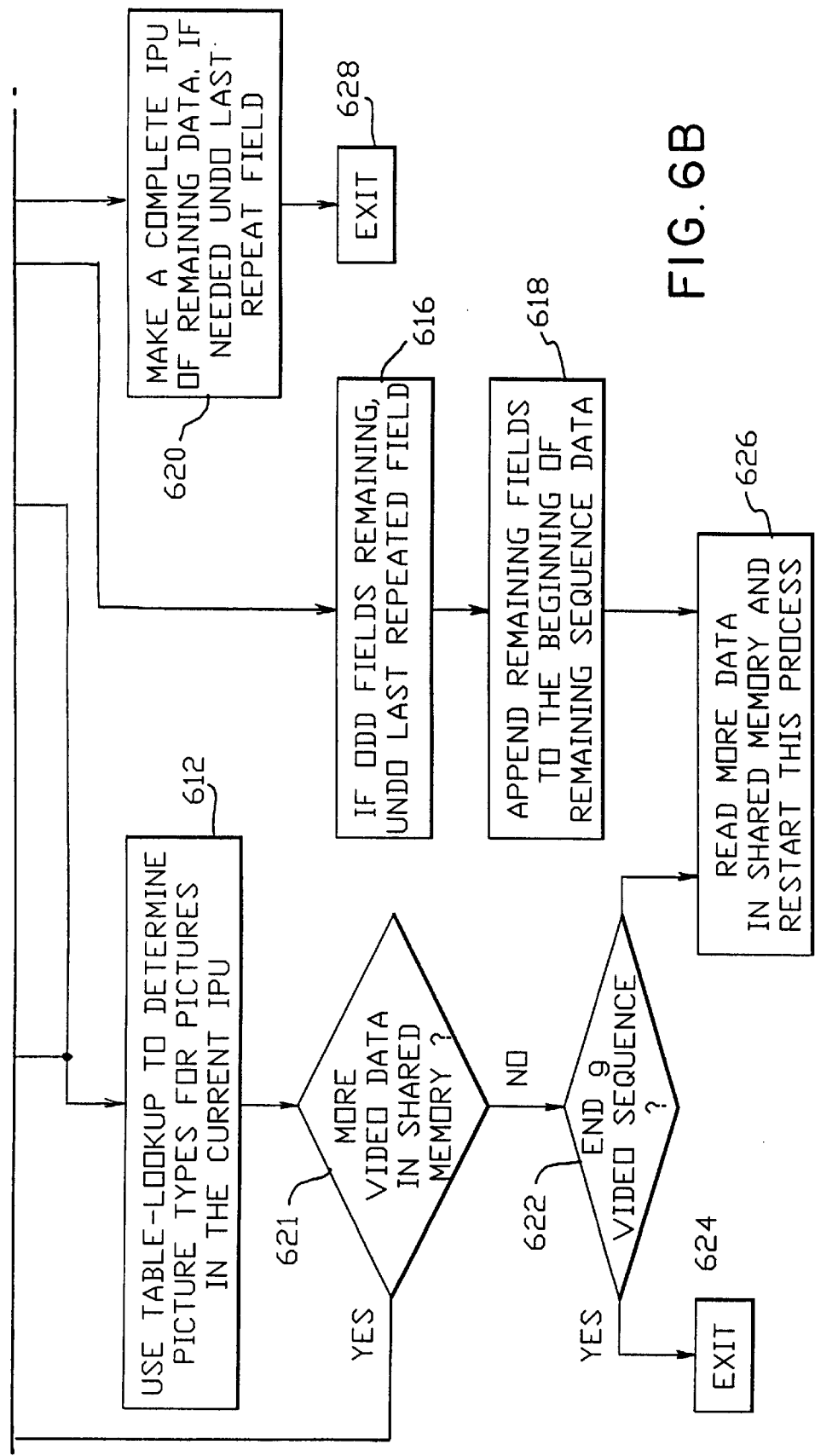

VIDEO COMPRESSION USING MULTIPLE COMPUTING AGENTS

This is a division of application Ser. No. 08/471,315, filed Apr. 6, 1995, now U.S. Pat. No. 5,694,170.

BACKGROUND OF THE INVENTION

A. Field of the Invention

The present invention relates to the field of data compression and, more particularly, to systems and techniques for compressing digital motion video signals.

B. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to transmission and storage of compressed digital video in a variety of applications, including: video-telephony and teleconferencing; high quality digital television transmission on coaxial and fiber-optic networks as well as broadcast terrestrially and over direct broadcast satellites; and in interactive multimedia products on CD-ROM, Digital Audio Tape, and disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 standard (ISO/IEC JTC1/SC2/WG11 MPEG 91/74 MPEG Video Report Draft, CD-11172, 1991) and and MPEG-2 Standard (ISO/IEC 13818-2, 1994).

The MPEG standards have been developed by the Moving Picture Experts Group (MPEG), part of a joint technical committee of the International Standards Organization (ISO) and the International Electrotechnical Commission (IEC). The MPEG committee has been developing standards for the multiplexed, compressed representation of video and associated audio signals. The standards specify the syntax of the compressed bit stream and the method of decoding, but leave considerable latitude for novelty and variety in the algorithm employed in the encoder.

The MPEG-1 standard was developed for use in compressing progressive video. A progressive video sequence is a sequence in which each frame represents a scene as it is viewed at a discrete time instance. By contrast, for interlaced video, a field—every other line on the screen—is captured periodically. For interlaced video, at alternating time instances the top and bottom field on a screen is refreshed. At any given time, data from two fields—a frame—can be seen.

The MPEG-2 standard, can be used to compress either interlaced video, progressive video, or a mixture of progressive and interlaced video: the encoder specifies whether each frame is progressive or interlaced.

By today's yardstick, compressing a video sequence into high quality MPEG bit stream is a computationally intensive task. The video compression process is sequential in nature, i.e., there are many temporal dependencies. These dependencies arise primarily from the need to do motion estimation and the need to stay within the specified bit-rate constraints, i.e., rate control. As a result of these dependencies, it is difficult to use multiple processors to parallelize (and hence speed up) the compression process.

One conventional method of performing MPEG-1 compliant video compression is to parallelize the compression at the macroblock level, i.e., each processor compresses a macroblock. While superior to pure sequential processing, this fine grain of parallelism leads to significant communication overheads among processors and between the processors and the shared memory.

SUMMARY OF THE INVENTION

In view of the above, it is an object of the present invention to provide a system and techniques for performing video compression using coarse grain parallelism effected by multiple processors or compressing agents.

One aspect of the present invention provides a system and method of using multiple processors to perform video compression is provided. In accordance with the method, a video sequence is partitioned into subsequences and processing assignments for the subsequences are distributed among a plurality of processors. A picture type is then determined for each picture in each subsequence and the encoding complexity of each picture is modeled, based on the picture type. Based on the modeling, a number of bits is allocated to each picture. Each picture is compressed in accordance with the bits allocated.

Another aspect of the present invention provides a method for encoding pictures in a video sequence using a dynamic modeling of the encoding complexity of future pictures in the video sequence. In accordance with the method, bits are allocated to the encoding of a current picture in the video sequence based on the dynamic model. The current picture is then encoded based on the bits allocated.

BRIEF DESCRIPTION OF THE DRAWING

FIG. 6 is a flow chart showing the operation of the IPU Partitioner of FIG. 2;

DETAILED DESCRIPTION OF THE PREFERRED EMBODIMENTS a. MPEG environment

As the present invention may be applied in connection with an MPEG-2 encoder, in order to facilitate an understanding of the invention, some pertinent aspects of the MPEG-2 video compression standard will be reviewed. It is to be noted, however, that the invention can also be applied to other video coding algorithms which share some of the features of the MPEG-2 standard.

To begin with, it will be understood that the compression of any data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal. Step 2 is known as entropy coding.

Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 standard for Step 1 can be described as predictive/interpolative motion-compensated hybrid DCT/DPCM coding. Huffman coding, also known as variable length coding, is used in Step 2. Although, as mentioned, the MPEG-2 standard is really a specification of the decoder and the compressed bit stream syntax, the following description of the MPEG-2 specification is, for ease of presentation, primarily from an encoder point of view.

The MPEG video standards specify a coded representation of video for transmission. The standards are designed to operate on interlaced or noninterlaced component video. Each picture has three components: luminance (Y), red color difference $C_r$, and blue color difference $C_b$. The $C_r$ and $C_b$ components each have half as many samples as the Y component in both horizontal and vertical directions.

An MPEG data stream consists of a video stream and an audio stream which are packed, together with systems information and possibly other bit streams, into a systems data stream that can be regarded as layered. Within the video layer of the MPEG data stream, the compressed data is further layered. A description of the organization of the layers will aid in understanding the invention.

Figure 9:
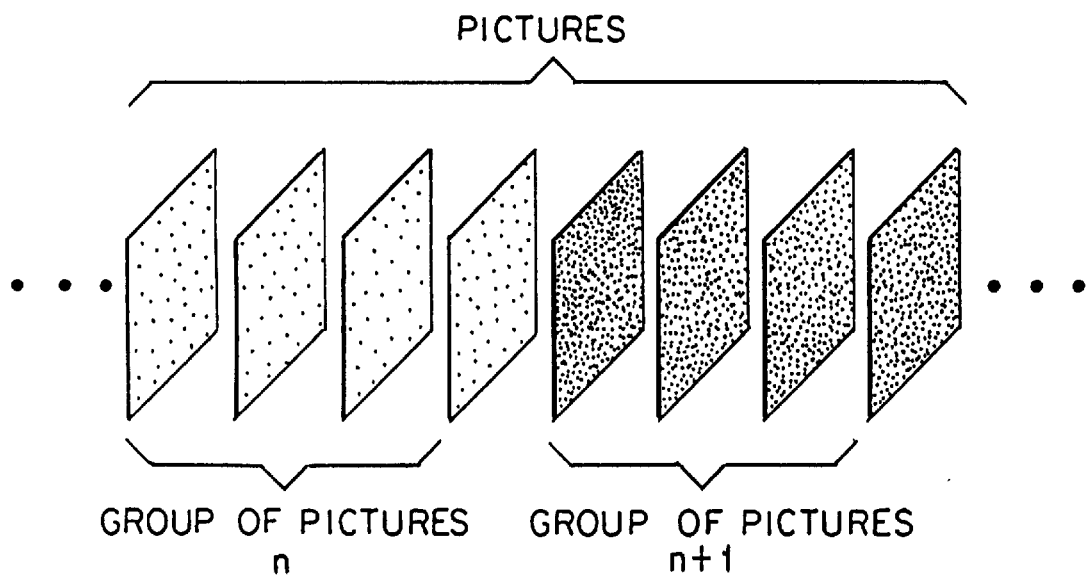
FIG. 9 shows a Group of Pictures layer.

The layers pertain to the operation of the compression scheme as well as the composition of a compressed bit stream. The highest layer is the Video Sequence Layer, containing control information and parameters for the entire sequence. At the next layer, a sequence is subdivided into sets of consecutive pictures, each known as a Group of Pictures (GOP). A general illustration of this layer is shown in FIG. 9. Decoding may begin at the start-of any GOP, essentially independent of the preceding GOP's. There is no limit to the number of pictures which may be in a GOP, nor do there have to be equal numbers of pictures in all GOP's.

Figure 10:
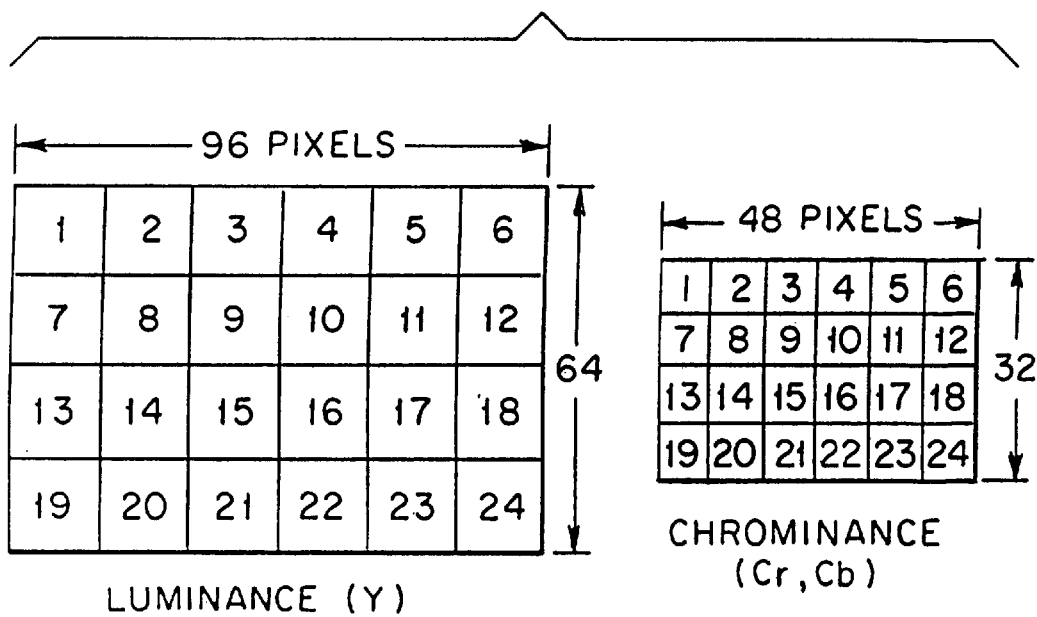
FIG. 10 shows a Picture layer.

The third or "Picture" layer is a single picture. A general illustration of this layer is shown in FIG. 10. The luminance component of each picture is subdivided into 16×16 regions; the color difference components are subdivided into appropriately sized blocks spatially co-sited with the 16×16 fluminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as "macroblock" (MB). Macroblocks in a picture are numbered consecutively in raster scan order.

Between the Picture and MB layers is the fourth or "Slice" layer. Each slice consists of some number of consecutive MB's. Slices need not be uniform in size within a picture or from picture to picture.

Figure 11:
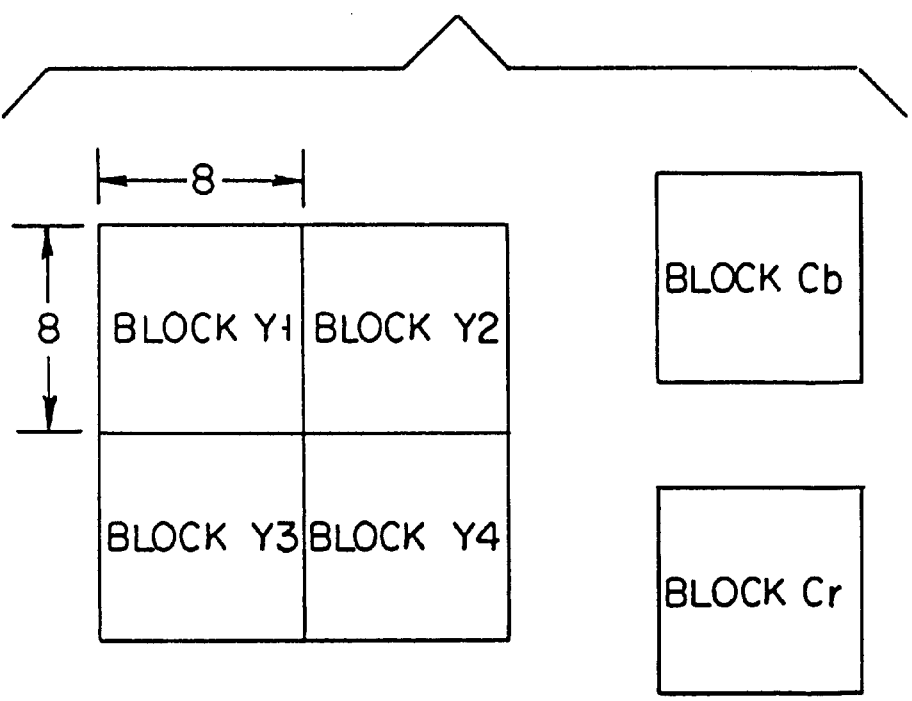
FIG. 11 show components of a Macroblock.

Finally, as shown in FIG. 11, each MB consists of four 8×8 luminance blocks and 8, 4, or 2 (for 4:4:4, 4:2:2 and 4:2:0 video) chrominance blocks. If the width of the luminance component in picture elements or pixels of each picture is denoted as C and the height as R (C is for columns, R is for rows), a picture is C/16 MB's wide and R/16 MB's high.

The Sequence, GOP, Picture, and Slice layers all have headers associated with them. The headers begin with byte-aligned "Start Codes" and contain information pertinent to the data contained in the corresponding layer.

A picture can be either a field-structured or frame-structured. A frame-structured picture contains information to reconstruct an entire frame, i.e., two fields, of data. A field-structured picture contains information to reconstruct one field. If the width of each luminance frame (in picture elements or pixels) is denoted as C and the height as R (C is for columns, R is for rows), a frame-structured picture contains information for C×R pixels and a frame-structured picture contains information for C×R/2 pixels.

A macroblock in a field-structured picture contains a 16×16 pixel segment from a single field. A macroblock in a -frame-structured picture contains a 16×16 pixel segment from the frame that both fields compose; each macroblock contains an 16×8 region from each of two fields.

Each frame in an MPEG-2 sequence must consist of two coded field pictures or one coded frame picture. It is illegal, for example, to code two frames as one field-structured picture followed by one frame-structured picture followed by one field-structured picture; the legal combinations are: two frame-structured pictures, four field-structured pictures, two field-structured pictures followed by one frame-structured picture, or one frame-structured picture followed by two field-structured pictures. Therefore, while there is no frame header in the MPEG-2 syntax, conceptually one can think of a frame layer in MPEG-2.

Figure 12:
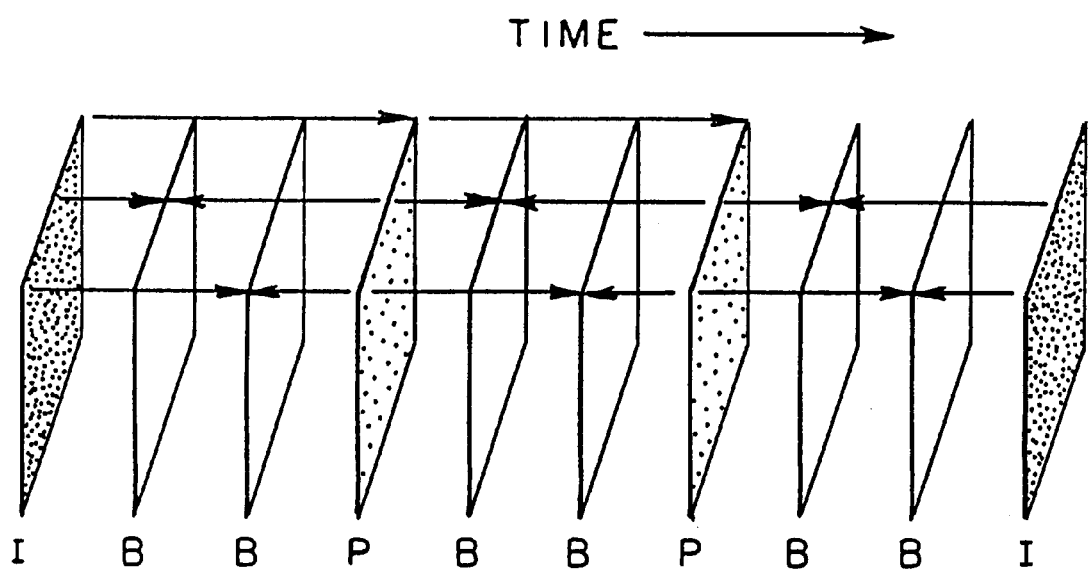
FIG. 12 shows the type of Pictures in a typical Group of Pictures.

Within a GOP, three "types" of pictures can appear. An example of the three types of pictures within a GOP is shown in FIG. 12. The distinguishing feature among the picture types is the compression method used. The first type, Intra-mode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P-pictures) are reconstructed from the compressed data in that picture and two most recently reconstructed fields from previously displayed I or P pictures. Bidirectionally motion-compensated pictures (B- pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called anchor pictures. For purposes of this specification, an anchor picture is referred to as a terminal picture if the next anchor picture is an I-picture.

One very useful image compression technique is transform coding. In MPEG and several other compression standards, the discrete cosine transform (DCT) is the transform of choice. The compression of an I-picture is achieved by the steps of 1) taking the DCT of blocks of pixels, 2) quantizing the DCT coefficients, and 3) Huffman coding the result. In MPEG, the DCT operation converts a block of 8×8 pixels into an 8×8 set of transform coefficients. The DCT transformation by itself is a lossless operation, which can be inverted to within the precision of the computing device and the algorithm with which it is performed.

The second step, quantization of the DCT coefficients, is the primary source of lossiness in the MPEG standards. Denoting the elements of the two-dimensional array of DCT coefficients by $c_{mn}$, where m and n can range from 0 to 7, aside from truncation or rounding corrections, quantization is achieved by dividing each DCT coefficient $c_{mn}$ by $w_{mn} \times$ QP, with $w_{mn}$ being a weighting factor and QP being the macroblock quantizer. Note that QP is applied to each DCT coefficient. The weighting factor $w_{mn}$ allows coarser quantization to be applied to the less visually significant coefficients.

There can be several sets of these weights. For example, there can be one weighting factor for I-pictures and another for P- and B-pictures. Custom weights may be transmitted in the video sequence layer, or defaults values may be used. The macroblock quantizer parameter is the primary means of trading off quality vs. bit-rate in MPEG-2. It is important to note that QP can vary from MB to MB within a picture. This feature, known as adaptive quantization (AQ), permits different regions of each picture to be quantized with different step-sizes, and can be used to equalize (and optimize) the visual quality over each picture and from picture to picture. Typically, for example in MPEG test models, the macroblock quantizer is computed as a product of the macroblock masking factor and the picture nominal quantizer.

Following quantization, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is motion compensation. MPEG-2 provides several tools for motion compensation (described below).

All the methods of motion compensation have the following in common. For each macroblock, one or more motion vectors are encoded in the bit stream. These motion vectors allow the decoder to reconstruct a macroblock, called the predictive macroblock. The encoder subtracts the predictive macroblock from the macroblock to be encoded to form the difference macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. A method of motion compensation is described by the macroblock mode and motion compensation mode used. There are four macroblock modes, intra (I) mode, forward (F) mode, backward (B) mode, and interpolative forward-backward (FB) mode. For I mode, no motion compensation is used. For the other macroblock modes, 16×16 (S) or 16×8 (E) motion compensation modes can be used. For F macroblock mode, dual-prime (D) motion compensation mode can also be used.

The MPEG standards can be used with fixed bit-rate transmission media. However, the number of bits in each picture will not be exactly constant, due to the different types of picture processing, as well as the inherent variation with time of the spatio-temporal complexity of the scene being coded. The MPEG standards use a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows.

Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer. In order that the bit stream satisfy the MPEG rate control requirements, it is necessary that all the data for each picture is available within the buffer at the instant it is needed by the decoder. This requirement usually translates to upper and lower bounds $U_{VBV}$ and $L_{VBV}$ on the number of bits allowed in each picture. The upper and lower bounds for a given picture depend on the number of bits used in all the pictures preceding it. It is the function of the encoder to produce bit streams which satisfy this requirement. To meet this requirement, a rate control method may rely on knowledge of the norm of the difference macroblock (hereafter, the prediction error) for each macroblock. An example of such a rate control method is described in the U.S. Pat. No. 5,231,484 to Gonzales and Viscito, which is incorporated by reference as if printed in full below. For that method, the encoder calculates the prediction error for each macroblock in a picture before encoding that picture.

b. A Multiprocessor Embodiment for Video Compression

Figure 5:
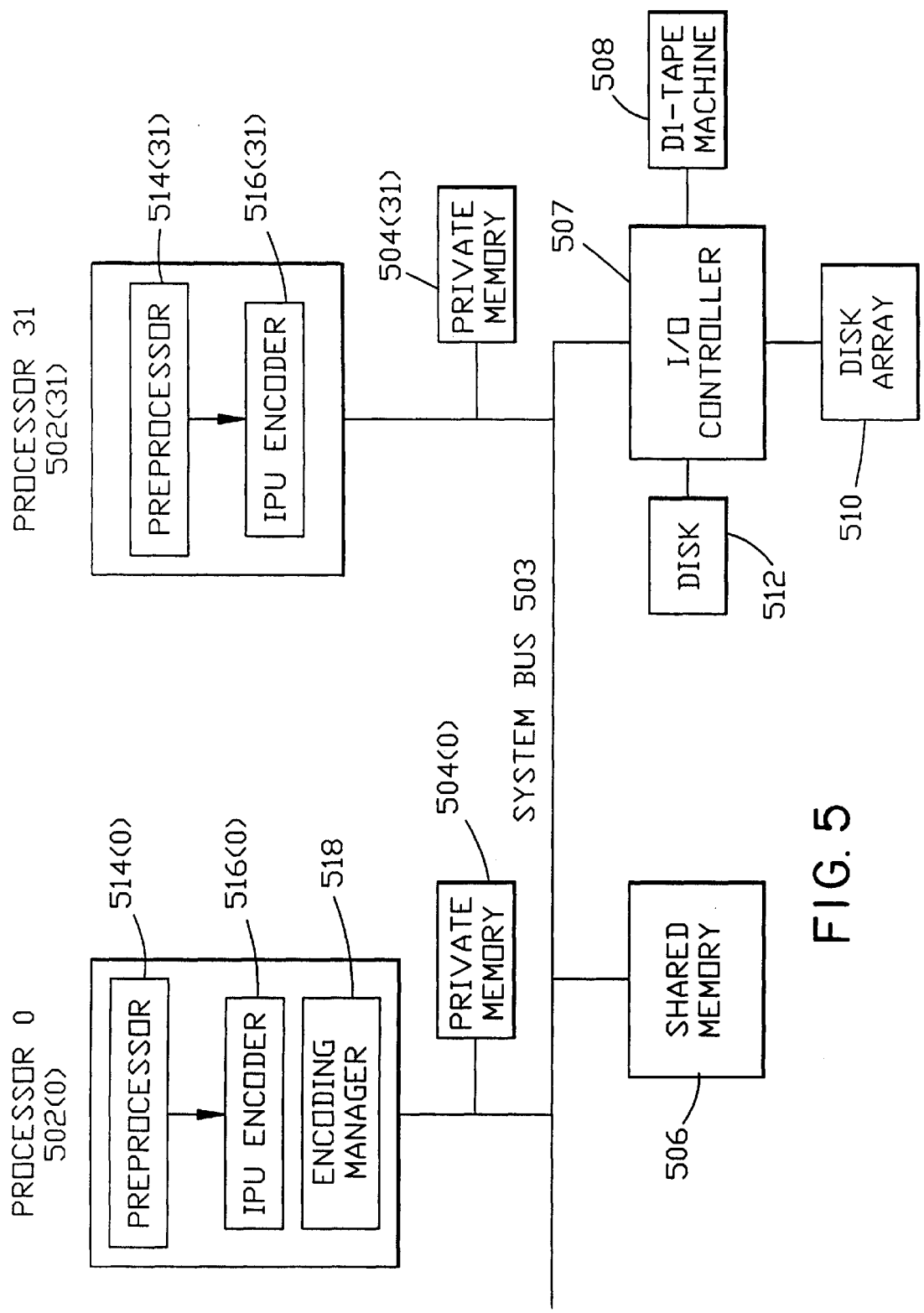
FIG. 5 shows a computer system embodying a video compression system in accordance with the principles of the present invention.

A computing system suitable for use in conjunction with the present invention is shown in FIG. 5. The system of FIG. 5 includes 32 processors 502(0)–502(31) interconnected by way of a system bus 503 (which carries both addresses and data). Each processor includes a private random access memory 504(0)–504(31). The system also includes a shared random access memory 506. The random access memories 504(0)–504(31), 506 are preferably conventional semiconductor memories. In addition to the above, the system includes an I/O controller 507 which provides access to a D1 tape machine 508, a disk array 510, and a standalone disk 512.

The D1 tape machine is used, in the context of this embodiment, to read uncompressed motion picture video's stored on tape in conventional D1 format. For future reference, these videos will be referred to as the "source material". The disk array 510 is used for caching segments of the source material. The standalone disk 512 is used for storing the compressed video stream (derived from the source material) output by the system in accordance with the principles of the present invention.

Each of the processors includes a preprocessor 514(0)–514(31) and an IPU encoder 516(0)–516(31) which receives the output of the preprocessor. One processor 502(0) (sometimes referred to in the specification as the "encoding control processor") includes an encoding manager 518. The preprocessors and the IPU encoders are preferably embodied as program code executed out of each processor's private memory 504(0)–504(31) as applicable. The encoding manager 518, is also preferably embodied as program code executing on the encoding control processor 502(0) out of its private memory 504(0). It should be understood that the preprocessors, the IPU encoders and the encoding manager could alternatively be embodied in hardware logic.

Figure 1:
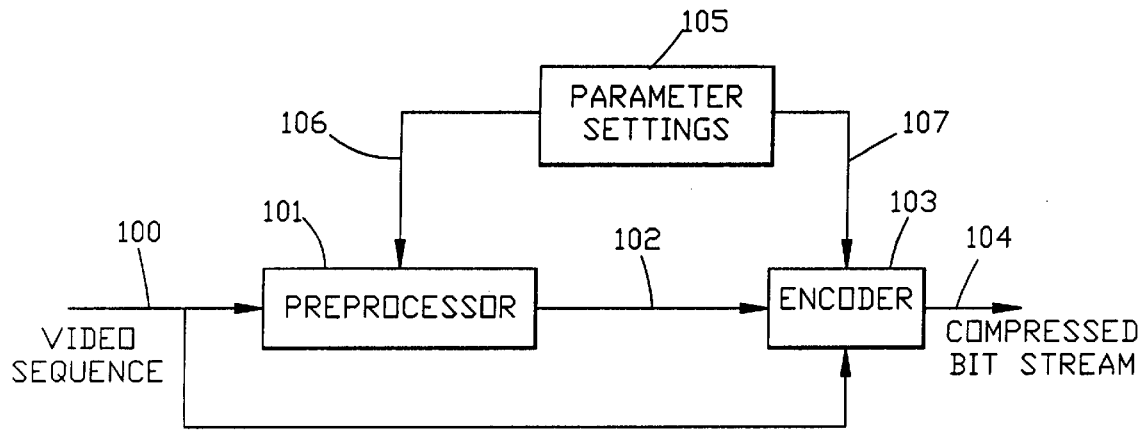
FIG. 1 is an overview of an video compression system according to an embodiment of the present invention.

FIG. 1 shows a general overview of the process performed by the system of FIG. 5. The preprocessor 101 of FIG. 1 generally represents the work performed by the combination of the preprocessors 514(0)–514(31) of FIG. 5. Similarly, the encoder 103 of FIG. 1 generally represents the work performed by the IPU encoders 516(0)–516(31) of FIG. 5. Compression parameters used by the system are input by the user in the form of a parameter settings file 105 on the standalone disk 512 which is read and processed by the encoding manager 518 of FIG. 5. An uncompressed video sequence from the D1 tape machine 508 (via the disk array 510) is also provided as an input 100 to the system.

The Preprocessor 101 performs several auxiliary functions, including assigning picture structures, picture-types and the number of fields to the pictures in the input video sequence based on a subset of the parameters 106 taken from the parameter settings file 105. The input to the encoder 103 is another subset of the parameters 107 also taken from the parameter settings file 105 (e.g., bit rate), the input video sequence 100 and the auxiliary information 102 produced by the Preprocessor. At the output 104, the encoder produces a compressed MPEG-2 compliant bit stream of the input video 100 in accordance with the parameters settings file 105.

Figure 2:
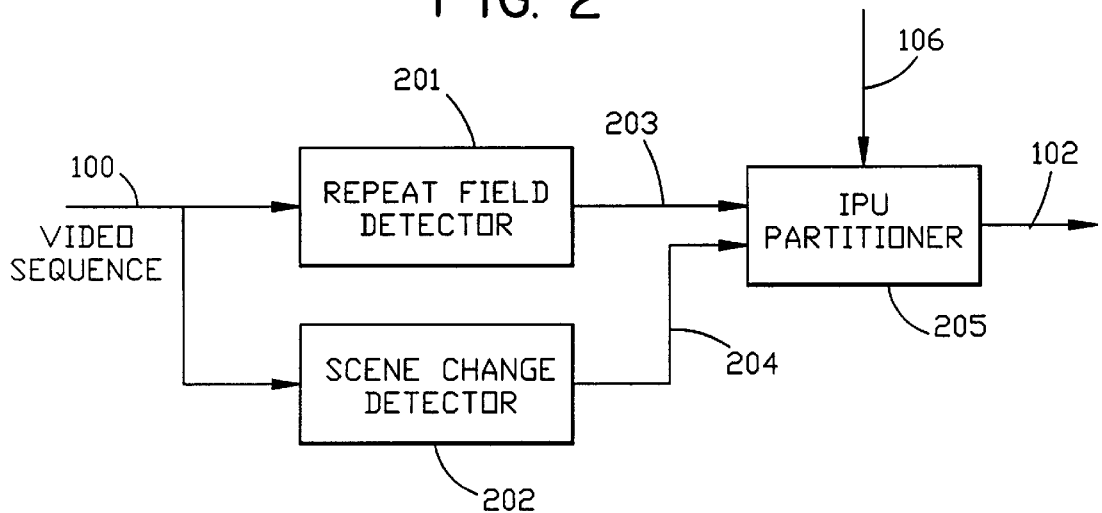
FIG. 2 is a more detailed diagram of the Preprocessor of FIG. 1.

The structure of the preprocessors 514(0)–514(31) is shown in FIG. 2. The input video 100 is processed by a repeat-field detector 201 (which uses conventional 3:2 pull down inversion) and then by a scene-change detector 202. Both repeat field detection and scene change detection are known in the art and will not be described in further detail here. The outputs 203 and 204, respectively, of these detectors are passed on as the input to an IPU partitioner 205. The IPU partitioner is part of the encoding manager 518 and is thus present in only the encoding -control processor 502(0). The IPU partitioning function will be described in more detail later. The output of the Preprocessor is the auxiliary information 102.

Figure 3:
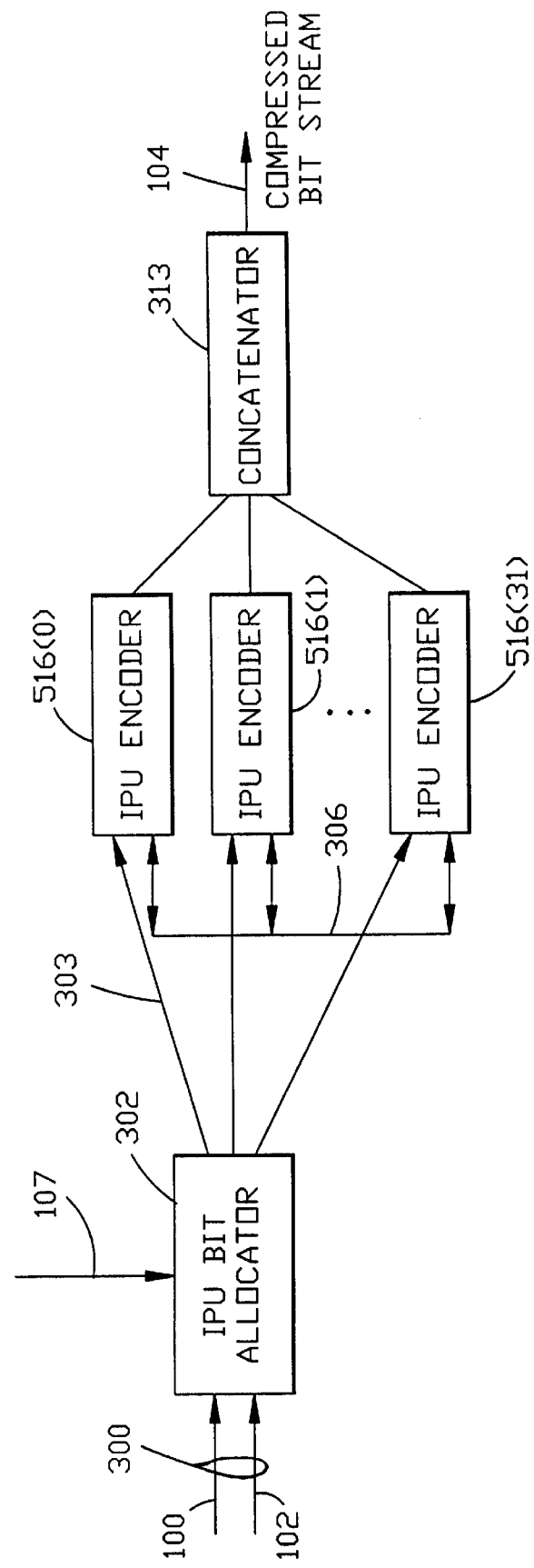
FIG. 3 is a more detailed diagram of the Encoder of FIG. 1.

An encoder structure is shown in FIG. 3. The input to the encoder is a video sequence partitioned into IPUs 300 and a subset of user selected parameters 107. An I partition unit (IPU) consists of all pictures (in display order) between two terminal pictures; the second terminal picture is included in the IPU but the first one is not. There are two exceptions to this definition. The first IPU begins at the start of the sequence and ends at the first terminal picture (inclusive). The last IPU begins with the first picture immediately after the last terminal picture, and includes all pictures through to the end of the sequence. A bit allocation unit (BAU) is a set of one or more consecutive IPUS.

The video sequence 300 is actually a combination of the video input 100 and auxiliary data 102. At this point, the picture types have already been assigned by the IPU partitioner 205. Bits are allocated to the IPUs by an IPU Bit Allocator 302 which is also preferably part of the encoding manager 518. The number of bits assigned to an IPU can, for example, equal the total display-time of the IPU multiplied by the desired bit rate.

The output of the IPU Bit Allocator is connected to each of the inputs 303 of the IPU Encoders 516(0)–516(31). In addition, the IPU Encoders are coupled by a connection 306 which represents an area of the shared memory 506. This is used to exchange encoder-reconstructions of the last-reconstructed anchor pictures of the IPUs.

The IPU Bit Allocator 302 also serves as a distributor of IPUs to various IPU Encoders. It picks the next IPU from its input 300, allocates bits to it, and passes it on to the next available IPU Encoder. It also indicates to the IPU Encoder the number (processor ID) of the IPU Encoder which encoded the previous IPU.

The encoder also includes a concatenator 313 which is part of the encoding manager 518. The concatenator assembles all the IPU bit streams in correct temporal order, and puts it on its output 104.

Consider the case when the IPU is passed on to IPU Encoder 516(0). If needed, IPU Encoder 516(0) picks up the previous reconstructed anchor over the interconnect 306 by referencing the appropriate processor ID. Then, it produces a bit stream for the complete IPU and puts it out to the concatenator 313. The concatenator 313 assembles all the IPU bit streams in correct temporal order, and puts the concatenated bit stream on its output 104. It is possible that the previous reconstructed anchor is not yet available in the shared memory. In this case, pictures that do not require the previous reconstructed anchor are encoded first and encoding of those pictures requiring the previous reconstructed anchor is postponed until it becomes available. This is referred to in this specification as "out of order" encoding.

Figure 4:
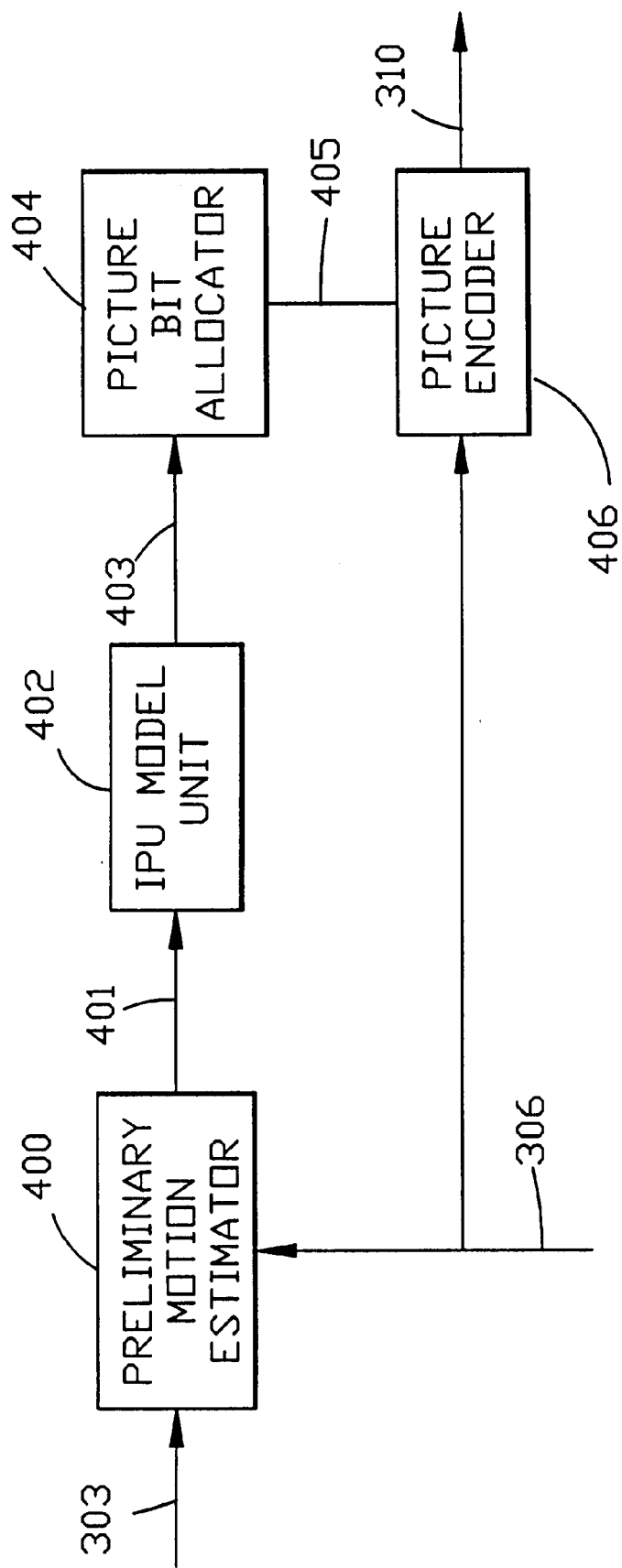
FIG. 4 is a more detailed diagram of an IPU encoder of the type shown in FIG. 3.

The structure of the IPU encoders is shown in more detail in FIG. 4. The input 303 to an IPU Encoder is a complete IPU and the number of bits allocated to that IPU. For each macroblock of each picture in the IPU, a preliminary motion estimator 400 computes the following quantities as applicable: integer level motion vectors, masking factors, the ac energies, and the energy of the difference between the macroblock being processed and its prediction given by the motion vectors. For macroblock i of a particular picture, these quantities are denoted by $mv_i$, $maskf_i$, $ac_i$, and $diffe_i$, respectively. This information is passed on to an IPU model unit 402. The IPU model unit 402 uses this information to construct an encoding model of each picture. These models are used by a Picture Bit Allocator 404 to allocate bits to pictures. The modeling process and the bit allocation process will be explained in more detail later by reference to FIG. 7 and 8 respectively.

A Picture Encoder 406 receives the picture L and its bit allocation as an input 405. If necessary, it picks up a reconstructed anchor from the previous IPU via input 306 using the appropriate processor ID. Then, the picture encoder encodes the picture within its given bit budget $a_L$ to produce the compressed bit stream (for the picture) at its output 310. Techniques for encoding a picture within a given bit budget are known in the art. An example of a suitable technique appears in U.S. Pat. No. 5,231,484. If desired, the picture encoder can be of a type that remodels the encoding complexity of a picture during encoding.

The IPU partitioner 205 will now be described in more detail by reference to FIG. 6. The IPU Partitioner is preferably embodied as program code in the encoding manager 518. The input video frames (which are available in shared memory) 506 are split evenly among processors. All the processors are synchronized after Repeat Field Detection and Scene Change Detection. Subsequently, only the encoding control processor 502(0) is used to compute the IPU partition. The other processors remain idle during this computation.

As part of the parameter settings file 105, the user specifies the maximum ipu size (maxipu) and the nominal ipu size (nomipu). Suppose that the first i fields in the shared memory segment have already been assigned to the first m IPUs (numbered 0, 1, . . . , m−1). Then IPU m is defined to begin at the (i+1)th field. In step 602, the encoding control processor 502(0) (using repeat field data), identifies pictures that fit into the next 2(maxipu+1) fields. If there is not sufficient field data to perform this process, this step is skipped. If, in step 604 it is determined that there was sufficient field data, step 606 is entered to determined if there is a scene change in this set of pictures. If there is a scene change, then in step 608 the current IPU terminates with the picture just preceding this scene change. Otherwise, in step 610 the current IPU is defined to contain the largest initial sequence of pictures that include at most 2*nomipu fields.

Once the number of pictures in the current IPU has been determined, in step 612 picture types are assigned to these pictures. The picture types are determined by table-lookup in the IPU partitioner 205. Several tables may be used depending on the maximum number of consecutive B-pictures allowed and whether or not a new scene begins at the start of the current IPU. There is one table for each element of {new scene, old scene}×{0,1,2} where the scene change detector 202 determines whether the current IPU begins a new scene or continues an old scene and where 0,1,2 determine the maximum number of consecutive B-pictures and is specified as a user input as part of the parameters settings file 105.

For example, if IPU m starts with a new scene, has eleven pictures and at most two consecutive B pictures are allowed, then the eleventh entry of table (new scene, 2) may look like "I B P B P B P B P".

After the picture types for the current IPU are determined, step 621 determines if there is more video data for this segment in the shared memory. If so, the process is reentered in step 602 for the next IPU. If there is no more video data for this segment, step 622 determines if the end of the video sequence has been reached. If so, the process exits in step 624. If there is more source material for the video sequence, more data is read into the shared memory in step 626 and the process is reentered at step 600 to process the new data.

It may happen that while constructing the last IPU of the current video segment, the data for that segment runs out (i.e. has all been processed). In this case (detected in step 604) if there is more source material to be compressed (detected in step 614), in step 618 the remaining fields of the current segment are appended to the beginning of the next segment of data read into the shared memory from the disk array. Otherwise, in step 620 the remaining fields are put in an additional IPU by themselves. The process then exits in step 628.

In order to simplify the implementation, the system ensures that an even number of fields are carried over. This is accomplished in step 616 by undoing the last repeated field if the remaining number of fields are odd in number (prior to the undoing).

The above described scheme for selecting IPU size ensures that there will be frequent random access points in the compressed video bit stream. More precisely, suppose that the display time of a field is Tf seconds. (Then the display time of a frame is 2*Tf seconds.) If all pictures in the IPU are frame structured, then there is an I picture every 2*Tf*nomipu seconds when there are no scene changes.

As an alternate embodiment, the IPU Partitioner 205 need not determine the picture type for pictures in an IPU. Instead, the pictures types can be determined after or as part of the Preliminary Motion Estimator 400 in the IPU encoder.

The processing performed by the IPU model unit 402 will now be described by reference to FIG. 7. The IPU model unit is preferably embodied as program code in each IPU encoder 516(0)–516(32). Thus, it should be understood that each IPU model unit operates in parallel with the others, each on its own distinct IPU.

Figure 7A:
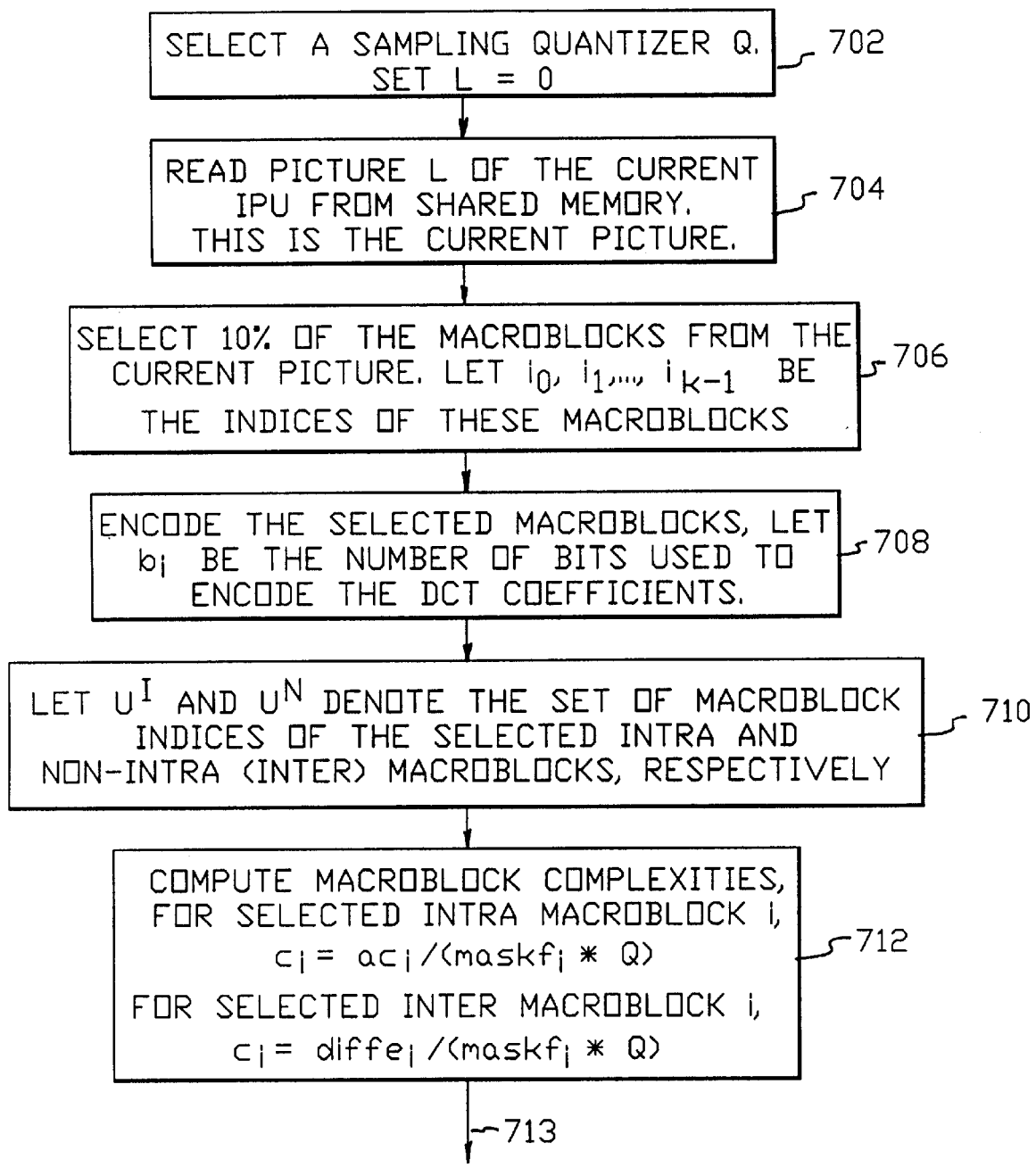
FIGS. 7A and 7B are a flow chart showing the operation of the IPU Model Unit of FIG. 4.
Figure 7B:
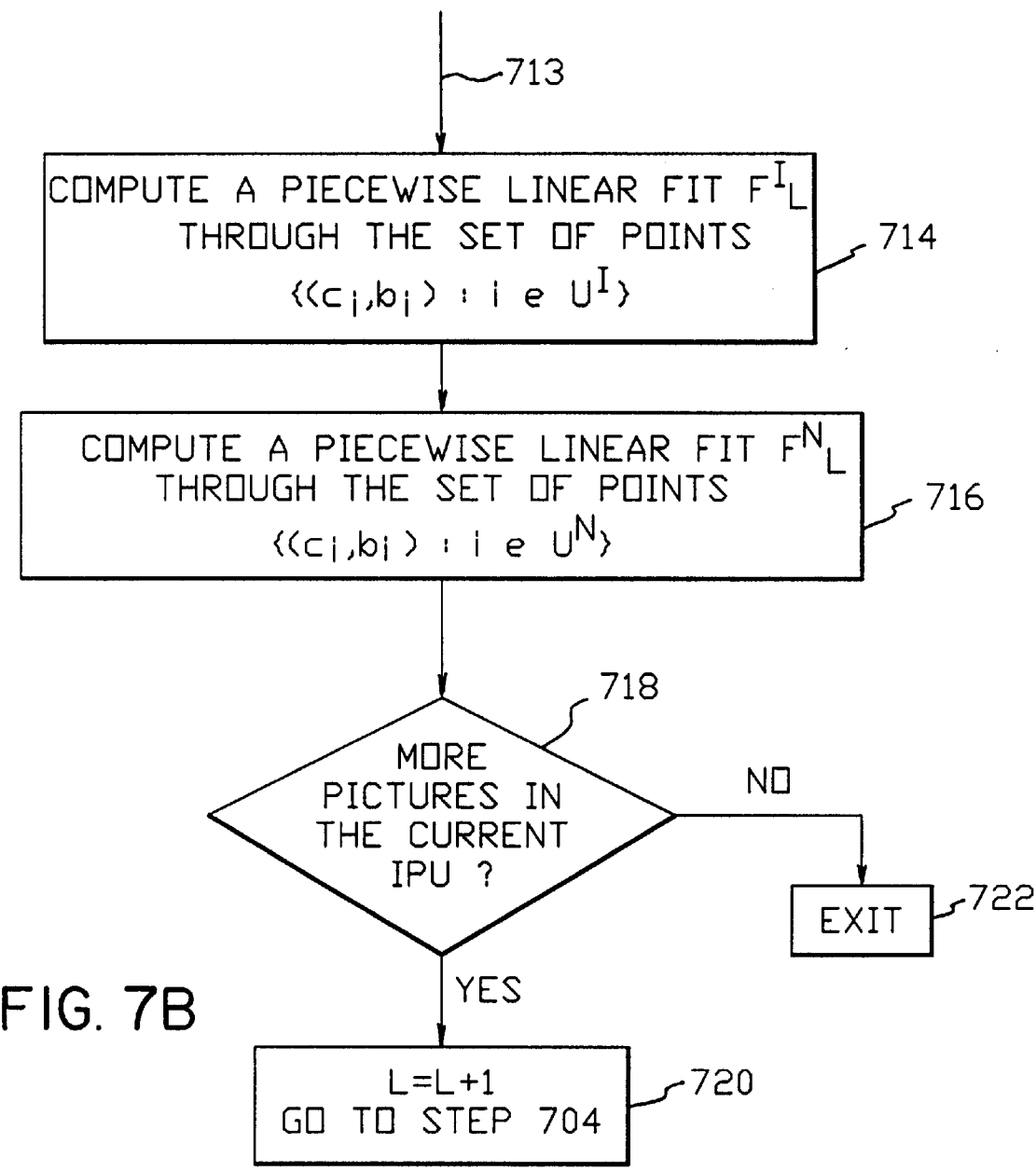
Figure 7:
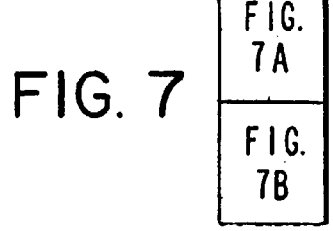

The steps of FIG. 7 are applied to each picture in the IPU.

In step 702 the IPU model unit selects a sampling quantizer Q based on the nominal quantizers of the previous IPUs. For example, the quantizer Q can be equal to the nominal quantizer of the last IPU for which such information is available. In addition, L is set to 0 (the index of the first picture in the IPU).

In step 704 the IPU model unit reads picture L of the current IPU from the shared memory.

In step 706 a (fixed) percentage (e.g. 10 percent) of macroblocks are randomly selected from the picture being processed. For purposes of this discussion, let macroblocks numbered $i_0, i_1, i_2, \ldots, i_{k-1}$ be the sampled macroblocks of picture L.

In step 708, the selected macroblocks are encoded and the number $b_i$ of DCT coefficient bits produced by each macroblock are measured. For intra macroblocks, the bits to encode the dc coefficient are not included in $b_i$. For non-intra macroblocks, the original is used as the reference for the encoding.

In step 710 the intra and inter (non-intra) macroblocks are separated into groups, $U^I$ for intra and $U^N$ for inter. Let maskf$_i$ be the masking factor for macroblock i.

In step 712 the complexity of each of the sampled macroblocks is computed. For intra macroblocks the complexity $c_i$ is the ac energy divided by the product of maskf$_i$ and the sampling quantizer Q; $c_i$=ac$_i$/(mask$_i$*Q). For inter macroblocks $c_i$=diffe$_i$/(maskf$_i$*Q).

In step 714, piecewise linear monotonically non-decreasing fits $F^I_L$ are computed through the set of points given by ($c_i$, $b_i$) for each macroblock i in the set of selected intra macroblocks $U^I$ (previously determined in step 706). The piecewise linear fits $F^I_L$ are stored in the computing processor's private memory 504(n).

In step 716, piecewise linear monotonically non-decreasing fits $F^N_L$ are computed through the set of points given by ($c_i$,$b_i$) for each macroblock i in the set of selected inter macroblocks $U^N$ (previously determined in step 706). The piecewise linear fits $F^N_L$ are stored in the computing processor's private memory 504(n).

In step 718 the IPU model unit determines if there are any more pictures to model in the current IPU. If there are more pictures to model step 720 is executed to increment L by one (L=L+1) and then the process is reentered at step 704. If there are no more pictures in the current IPU, the process exits in step 722.

Figure 8A:
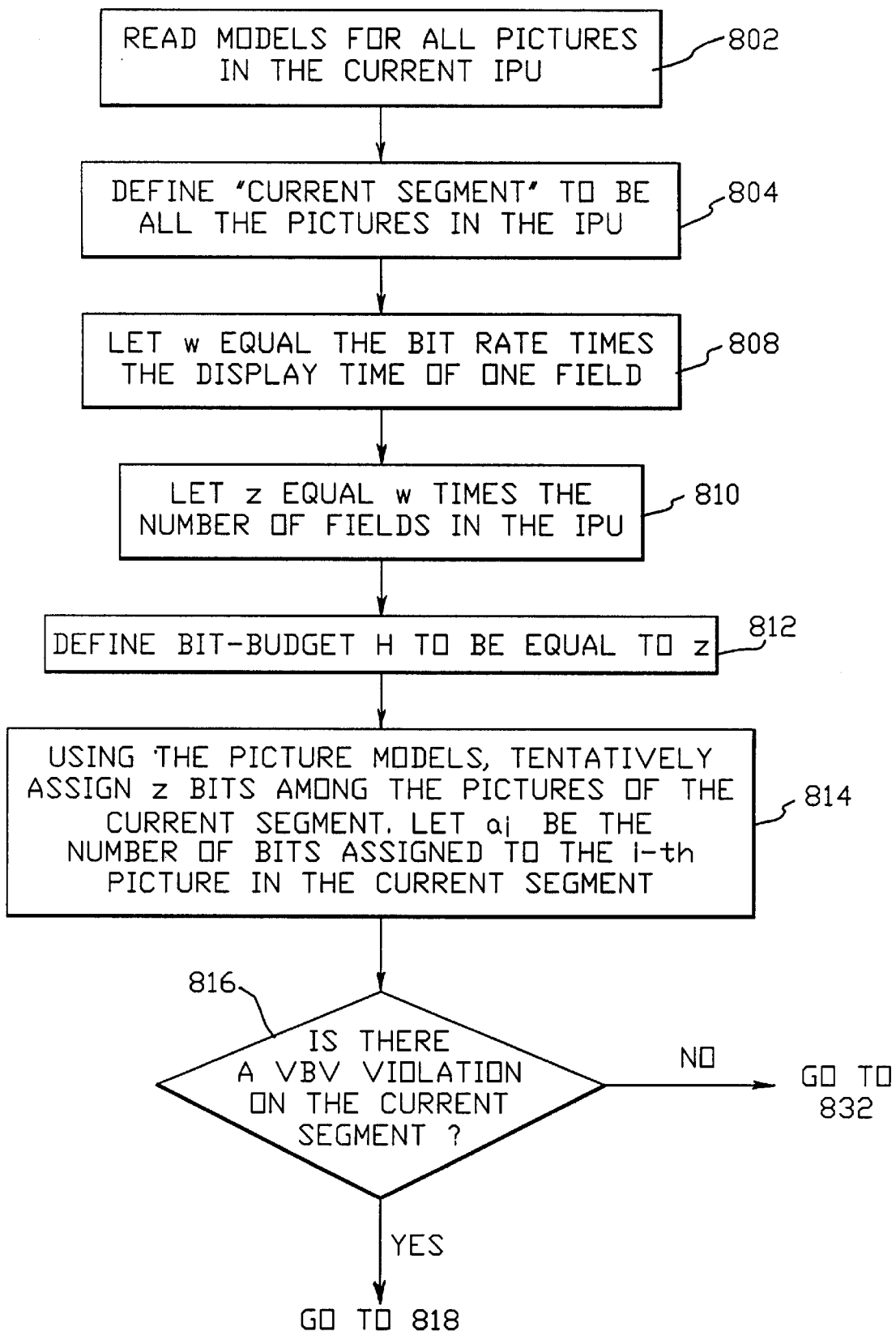
FIGS. 8A–8C are a flow chart showing the operation of the Picture Bit Allocator of FIG. 4.
Figure 8B:
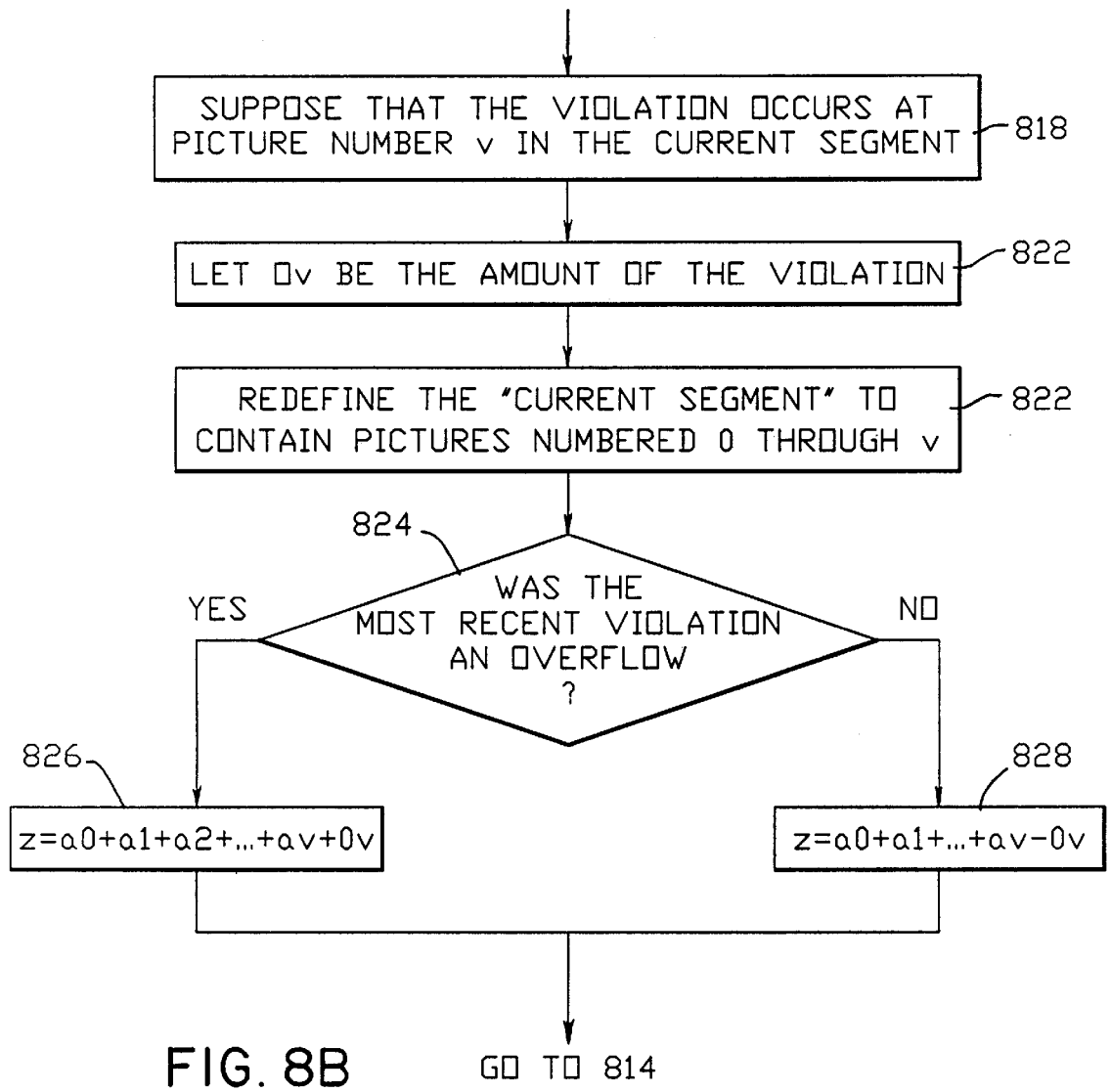
Figure 8C:
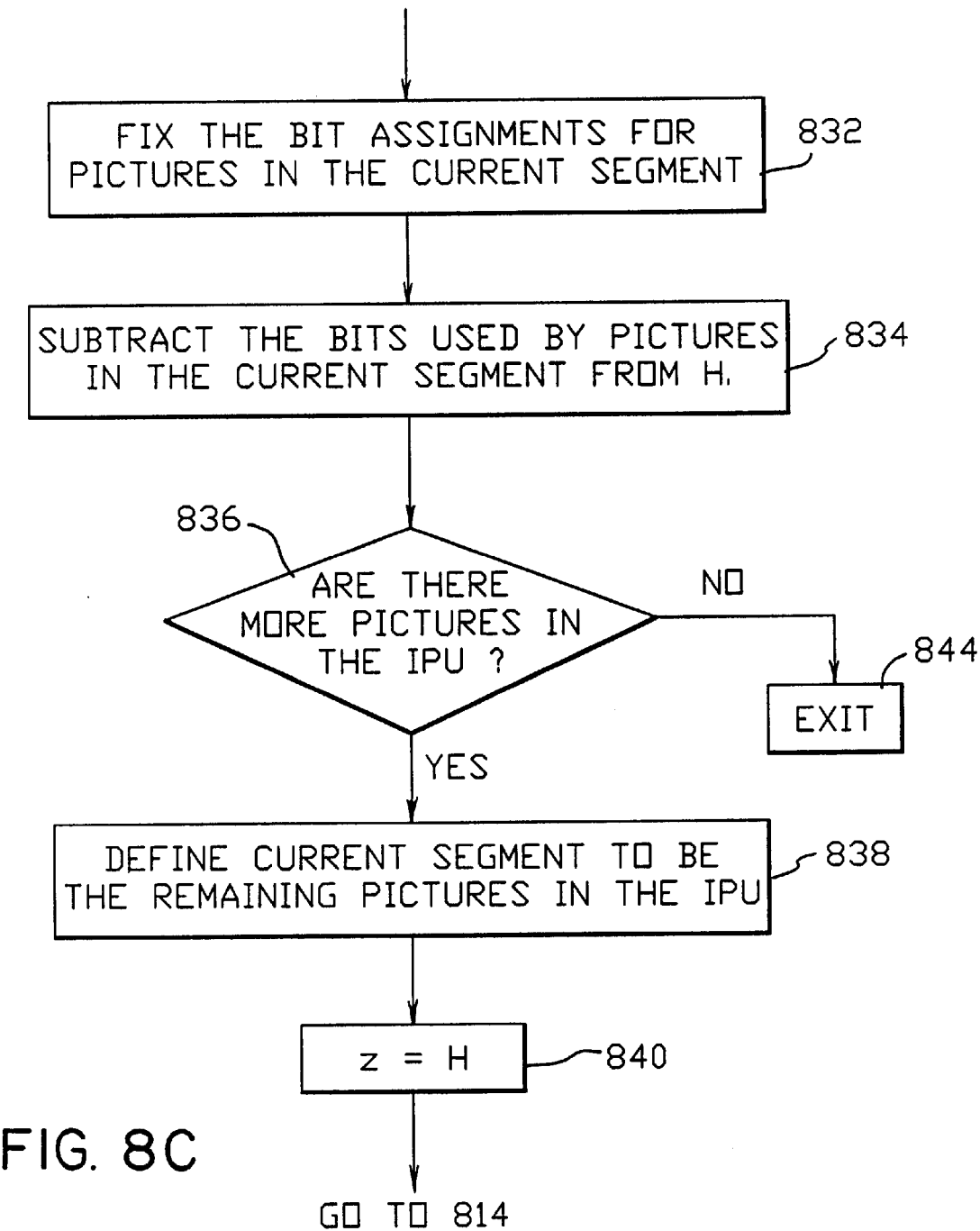

The processing performed by the picture bit allocator 404 will now be described by reference to FIG. 8. As with the IPU model unit, the picture bit allocator is preferably embodied as program code in each IPU encoder 516(0)–516(31). Thus, it should be understood that each picture bit allocator operates in parallel with the others, each on its own distinct IPU related data. For ease of description, we will assume that all pictures in the current IPU are frame structured.

For a given quantization x, the number of DCT coefficient bits required to encode each macroblock in the picture is estimated. Then, the estimates for the individual macroblocks are added to obtain an estimate for the picture. This estimate (for the picture L) is denoted by $e_L(x)$. If the ith macroblock is an intra macroblock, then the number of DCT coefficient bits required is estimated as $F^I_L(ac_i/(maskf_i*x))$. If the ith macroblock is an inter macroblock, then the number of DCT coefficient bits required is estimated as $F^N_L(diffe_i/(maskf_i*x))$. The number of "side" bits $s_L$ required can be estimated using well known conventional techniques as given in MPEG test models that will not be described in more detail here. The term "side" bits refers to all bits used to encode the picture except (1) for inter macroblocks, all DCT coefficient bits and (2) for intra macroblocks, all ac DCT coefficient bits.

First, in step 802 the models for all pictures in the IPU are read from the processor's private memory. Next, in step 804, the "current segment" is defined to be all the pictures in the IPU. In step 808, set variable w to be equal to the bit rate multiplied by the display time of one field. In step 810, set variable z equal to w times the number of fields in the IPU. In step 812, the bit budget H for the IPU is set equal to z.

In step 814 the z bits are preliminarily distributed among the pictures in the current segment such that the picture quality will be uniform throughout the current segment. It should be understood that this number of bits may not conform to MPEG bit allocation (VBV) restrictions. Preferably the preliminary assigning process is performed as follows.

For any quantizer x, the total number of bits required for the current segment is estimated as being equal to the sum of the estimates of DCT coefficient bits $e_i(x)$ for each picture plus the sum of the estimates for the other bits $s_L$ for each picture. Conventional bisection techniques are used to select an x that results in a value closest to (i.e. within a fixed threshold, such as 1%), but less than or equal to z. Once x is selected, the number of bits for each picture $a_L$ is determined by calculating $e_L(x)+s_L$ as described above; $a_L=e_L(x)+s_L$. In any events x must be selected to yield less than or equal to the number of bits assigned to the IPU by the IPU bit allocator.

In step 816 it is determined whether the MPEG VBV restrictions have been violated by any picture.

If there is no violation, in step 832 the number of bits is fixed to $a_L$ for each picture in the current segment. In step 834 the total number of bits used in the current segment is subtracted from H. Then, step 836 determines if there are more pictures in the current IPU. If there are no more pictures, the final bit assignments for all pictures in the IPU are provided to the picture encoder 406 by way the processor's private memory and the process then exits in step 844. If there are more picture, in step 838 the current segment is defined to be all of the remaining pictures in the IPU. Then, in step 840 z is set equal to H (z=H) and the process is reentered at step 814.

If in step 816 it is determined that there is a violation of the MPEG VBV restrictions by any picture, in step 818 the first picture v in which the violation occurs is identified by examining the pictures, in encoder sequence. Step 818 also determines whether the violation is for an overflow (too few bits used) or an underflow (too many bits used). In step 820, the number of bits 0v of the overflow or underflow is determined. In step 822, the current segment is redefined to consist of pictures 0 through v.

In step 824, a branch is taken depending on the violation type determined in step 818. If the violation was an overflow, in step 826 z is set equal to a0+a1+a2+ . . . +av+0v and the process is reentered at step 814. If the violation is an underflow, in step 828 z is set equal to a0+a1+a2+ . . . +av−0v and the process is reentered in step 814.

It should be understood that while the present embodiment has been described with respect to IPUs, the principles of the present invention are applicable to parallelization at the bit allocation unit (BAU) level as well.

If needed, motion concealment vectors for the first I-Picture in an IPU (or BAU) can be computed with respect to the original (as opposed to reconstructed) previous anchor.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method of encoding pictures in a video sequence comprising:

a) establishing a bit budget of Z bits for a present subsequence of the frames of the video sequence;

b) preliminarily distributing the Z bits among the frames of the present subsequence so as to provide uniform picture quality throughout the present subsequence;

c) determining whether the number of bits in frame v violates MPEG VBV restrictions regarding buffering allowable bits per picture for said video sequence; and d) redefining the subsequence as containing frames O to V and repeating steps b) and c) when the number of bits in frame V violates said restrictions.

2. The method of claim 1 wherein establishing the bit budget includes:

e) set w equal to the bit rate of the subsequence times the display time of a field of the present subsequence; and f) set Z equal to w times the number of fields.

3. The method of claim 1 further comprising, when there is no violation of said restrictions, the steps of:

ascertaining if there are additional frames remaining to be encoded;

defining a successive subsequence for said additional frames remaining to be encoded; and repeating said establishing a bit budget, preliminarily distributing, determining and redefining for said successive subsequence.

4. A method of encoding pictures in a video sequence comprising the steps of:

dynamically modeling an encoding complexity of future pictures in the video sequence;

establishing a present subsequence of pictures including the future pictures, past pictures and the present picture;

establishing a bit budget of Z bits for the present subsequence of the pictures of the video sequence;

allocating bits to the encoding of a current picture in the video sequence based on the modeling by preliminarily distributing the Z bits among the pictures of the present subsequence so as to provide uniform picture quality throughout the present subsequence;

determining whether the number of bits distributed through the present picture violates MPEG VBV restrictions regarding buffering allowable bits per picture for said video sequence;

redefining the present subsequence as containing frames 0 to the present picture and repeating said preliminarily distributing and said determining steps when the present picture violates said restrictions; and encoding the current picture based on the bits allocated.

5. The method of claim 4 wherein establishing the bit budget includes:

set w equal to the bit rate of the subsequence times the display time of a field of the present subsequence; and set Z equal to w tines the number of fields.

6. The method of claim 4 further comprising, when there is no violation of said restrictions, the steps of:

ascertaining if there are additional frames remaining to be encoded;

defining a successive subsequence for said additional frames remaining to be encoded; and repeating said establishing a bit budget, preliminarily distributing, determining and redefining for said successive subsequence.

* * * * *